(12) United States Patent
Teeter

(10) Patent No.: US 8,274,389 B2
(45) Date of Patent: Sep. 25, 2012

(54) DISPOSABLE AND TAMPER-RESISTANT RFID LOCK

(76) Inventor: Charles Michael Teeter, Joplin, MO (US)

( * ) Notice: Subject to any disclaimer, the term of this patent is extended or adjusted under 35 U.S.C. 154(b) by 0 days.

(21) Appl. No.: 12/819,902

(22) Filed: Jun. 21, 2010

(65) Prior Publication Data

US 2010/0253480 A1 Oct. 7, 2010

Related U.S. Application Data

(63) Continuation of application No. 11/960,128, filed on Dec. 19, 2007.

(60) Provisional application No. 60/875,726, filed on Dec. 19, 2006.

(51) Int. Cl.
*G08B 13/14* (2006.01)

(52) U.S. Cl. .................... 340/572.3; 340/572.9

(58) Field of Classification Search ............ 340/572.8, 340/572.3, 572.9, 652, 572.1
See application file for complete search history.

(56) References Cited

U.S. PATENT DOCUMENTS

| | | | |
|---|---|---|---|
| 6,188,320 B1 * | 2/2001 | Kolton et al. | 340/572.9 |
| 7,444,931 B2 * | 11/2008 | Streng | 100/35 |
| 7,486,188 B2 * | 2/2009 | Van Alstyne | 340/572.1 |
| 7,636,047 B1 * | 12/2009 | Sempek | 340/572.8 |
| 2004/0162524 A1 * | 8/2004 | Schiff et al. | 604/189 |
| 2007/0018832 A1 * | 1/2007 | Beigel et al. | 340/572.7 |
| 2007/0115130 A1 * | 5/2007 | Eveland | 340/572.7 |

OTHER PUBLICATIONS

U.S. Appl. No. 60/703,122, filed Jul. 2005, Lax et al., 340/572.8.*

* cited by examiner

*Primary Examiner* — Shirley Lu
(74) *Attorney, Agent, or Firm* — Polsinelli Shughart PC

(57) ABSTRACT

A disposable and tamper-resistant RFID lock that employs an RFID tag. Use of tamper evident housing. Disabling an RFID tag contained in the housing cutting, crushing, or puncturing the RFID tag.

9 Claims, 5 Drawing Sheets

DISPOSABLE AND TAMPER-RESISTANT RFID LOCK

CROSS REFERENCE TO RELATED APPLICATION

This application claims priority under 35 U.S.C. 120 to U.S. application Ser. No. 11/960,128 filed Dec. 19, 2007, now U.S. Pat. No. 7,800,504, and under 35 U.S.C. 119(e) and 37 C.F.R. 1.78(b) to U.S. Provisional Application Ser. No. 60/875,726 for Disposable and Tamper-Resistant RFID Lock of Fastener filed Dec. 19, 2006, and which is incorporated herein by reference.

FIELD OF THE INVENTION

The present invention relates to tamper resistant locks and fasteners, or more specifically to tamper resistant locking or fastening devices that house RFID tags, which also enable tracking and identification of goods and assets.

BACKGROUND

The use of radio frequency identification ("RFID") technology is increasingly being utilized to identify, track and locate goods or assets being shipped or transported. Various industries are coming to understand the benefits of RFID technology and as such are devoting more resources to this new technology. As a result, RFID technology is well known in the art. For example, RFID technology is now being used in various forms in the airline, food and drug industries to identify, track and locate an industry's particular goods or assets.

In addition to identifying, tracking and locating goods or assets, various industries are also attempting to employ prophylactic measures that prevent tampering of, theft of and terrorist activities directed to their assets or goods. The food and beverage industries in particular share such concerns. As an example, there is the potential for a bioterrorist or poisonous attack on food and beverages shipped or transported from manufacturers to packagers, wholesalers, distributors or retailers. To further illustrate the danger of such an attack, one may consider a typical manufacture, shipment and packaging of a dry food. Once a dry food is manufactured it may be shipped or transported in bulk to the manufacturer's packaging plant. The dry food is typically transported by a truck towing a trailer. The trailer may have openings at its top and bottom. Initially, the dry food is loaded through the openings at the top of the truck's trailer. The openings may take the form of a hatch or round opening with a cover. The truck will then transport the dry food to, for example, the packaging plant where the bottom openings of the truck's trailer are opened allowing the dry food to pour out into receptacles located beneath the truck and in the packaging plant. The drivers of the trucks transporting the dry food frequently make stops to eat, sleep and refuel the trucks. During such stops, trailers attached to the truck are particularly vulnerable to theft and tampering of the goods contained in the trailers. Individuals may gain access to the contents of the trailers via the openings on the top or bottom of the trailer. Locks may be used to secure the openings of the trailer, but such locks do not convey any information regarding the identification or location of a particular good or asset. Additionally, for the most part, locks fail to convey information that an individual attempted to tamper with a trailer's opening.

Accordingly, there is a need for a lock or fastener that prevents tampering of goods and assets and in addition, conveys information as to the identification and location of a good or asset contained and shipped via transportable containers. There is a also a need for a lock or fastener that indicates whether there has been an attempt to tamper with goods or assets contained and shipped via transportable containers. Finally, there is a need for a low cost, effective and disposable lock or fastener that prevents tampering of goods and assets while also providing information as to the identification and location of the good or asset contained and shipped via transportable containers.

Various objects and advantages of this invention will become apparent from the following description taken in conjunction with the accompanying drawings wherein are set forth, by way of illustration and example, certain embodiments of this invention.

The drawings, including FIGS. 1, 1a, 2 and 2a constitute a part of this specification, include exemplary embodiments of the present invention, and illustrate various objects and features thereof.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 1A:
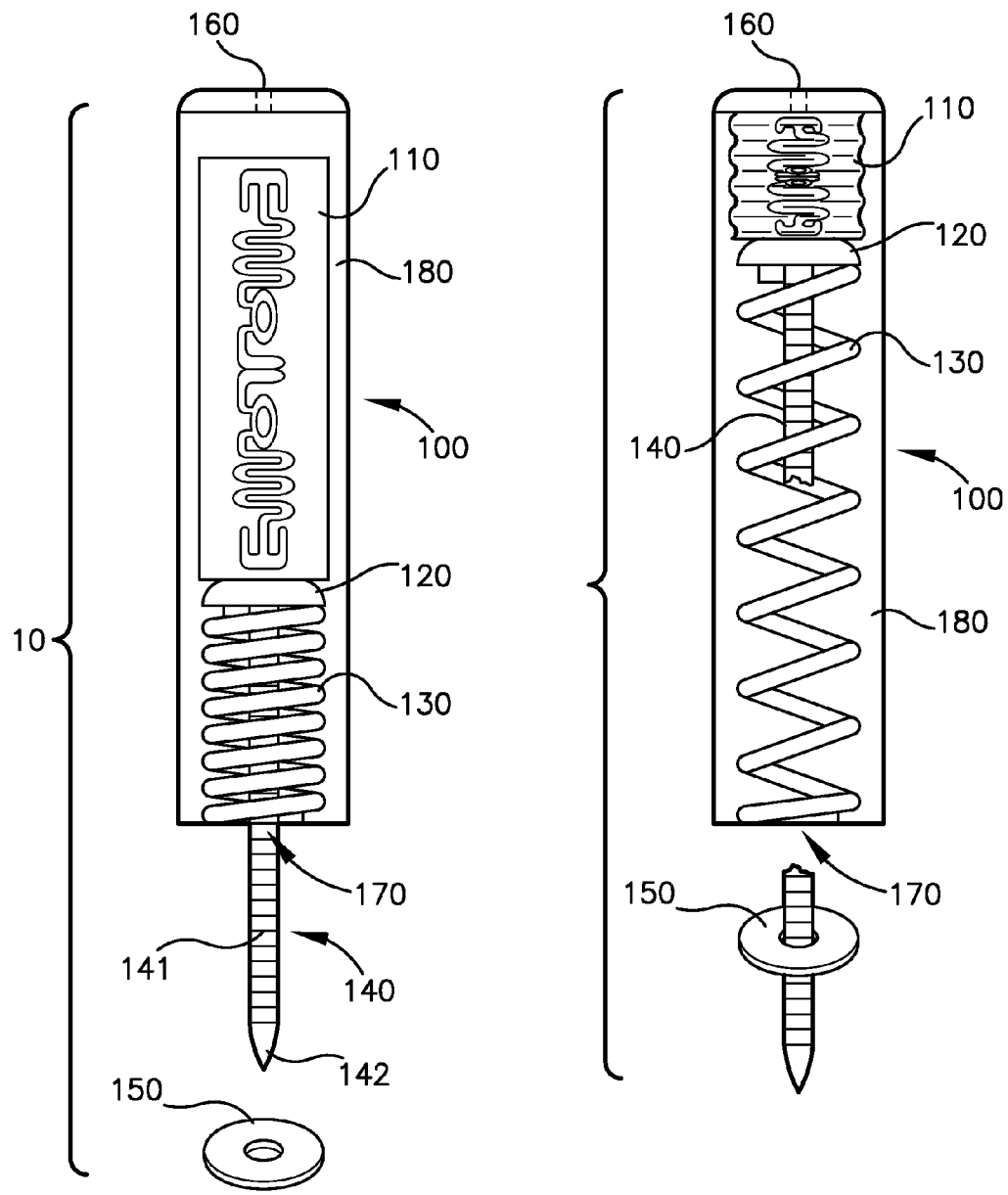
FIG. 1 is a front view of a first embodiment of a RFID lock according to the invention.
FIG. 1a is a front view of the first embodiment of a disabled RFID lock according to the invention.

Referring to FIG. 1, one embodiment of the invention, a Radio Frequency Identification ("RFID") lock 10, is shown comprising a housing 100 that contains a flexible RFID tag 110, a plate 120, a spring 130, a portion of a locking stem 140 attached to the plate 120 and a locking washer 150. The plate 120, spring 130, locking stem 140 and locking washer 150 constitute a disabling mechanism. The housing 100 has openings at the top 160 and bottom 170 of its structure. The top opening 160 allows a user to thread the RFID tag 110 into a cavity 180 of the housing 100. The top opening 160 is configured to allow a narrow RFID tag 110 to be threaded into the cavity 180. In addition, the top opening 160 is sufficiently narrow to prevent other items with greater width than the RFID tag 110 from entering the cavity 180 and to substantially prevent the RFID tag 110 from inadvertently passing back through the top opening 160. The bottom opening 170 of the housing 100, is configured to allow the locking stem 140 to move freely in and out of the housing 110. The housing is made of any suitable material, such as plastic, metal or ceramic, that is resistant to moisture and electrical charge. In addition, the housing must be made of any suitable material that allows a signal from a RFID tag's antenna to be detected. Pulling the locking stem 140 in a direction away from the bottom opening 170 of the housing 100, causes the plate 120 attached to the locking stem 140 to compress or "load" the spring 130. The locking stem 140 further comprises a plurality of one way ratchets 141 which when passed through the locking washer 150, prevents the locking stem 140 from moving in a reverse direction through the locking washer 150. As a result of the one way ratchets, when the tail end 142 of the locking stem 140 passes through the locking washer 150, the only direction the locking stem 140 may move is away from the bottom opening 170 of the housing 100. Since the plate 120 is attached to the locking stem 140, it too may only move in one direction once the locking washer 150 has engaged the locking stem 140. Such direction would be down towards the bottom opening 170 of the housing 100. Since the plate 120 is attached to the locking stem 140, it too may only move in one direction once the locking washer 150 has engaged the locking stem 140. Such direction would be down towards the bottom opening 170 of the housing 100.

By way of example, an embodiment of the present invention may be used to secure or lock the hatch or opening (described above) of a trailer containing dry food. The hatch or opening of a trailer may have a first metal ring attached to the trailer and a second metal ring attached to the hatch. The first metal ring aligns with the second metal ring attached to the hatch. In order to secure the hatch or opening, a user of the present invention would first thread the tail end 142 of the locking stem 140 through the second metal ring attached to the hatch. The width or diameter of the housing 100 is configured to prevent the housing 100 from passing through the second metal ring or the first metal ring. The user would next thread the tail end 142 of the locking stem 140 through the first metal ring. In order to lock or secure the hatch to the trailer, the user would then thread and pull the tail end 142 of the locking stem 140 through the locking washer 150. The user of the present invention would continue to pull the tail end 142 until the plate 120 loads the spring 130 sufficiently near the bottom opening 170 of the housing 100. As described previously, the one way ratchets 141 of the locking stem 140 prevent the locking stem 140 or plate 120 from moving upwards or into the cavity 180 of the housing 100. The one way ratchets 141 also prevent others from unlocking the RFID lock 10 from the hatch or opening of the trailer unless they cut the locking stem 140 in the area between the bottom opening 170 of the housing 100 and the locking washer 150. Once the hatch of the trailer is locked by the RFID lock 10, the user would lastly thread a RFID tag 110 through the top opening of the housing 160.

Turning now to FIG. 1a, one advantage of an embodiment of the present invention is shown when the locking stem 140 is cut. A user would know both visually and through the disablement of the RFID tag 110 that someone may have opened the hatch and tampered with the goods or assets located therein. In an embodiment of the present invention, the severing of the locking stem 140 disables the RFID tag 110. An RFID reader (not pictured) would be unable to detect a signal from the RFID tag 110 because the release of the locking stem 140 from the locking washer 150 results in the spring 130 unloading or decompressing and pushing the plate 120 towards the top opening of the housing 100 thereby crushing or crumpling the RFID tag 110. The plate 120 is of sufficient diameter or width such that when it is pushed by the spring 130 towards the top opening 160 of the housing 100, it will crush or crumple the RFID tag 110. It is well known in the art that even slightly bending an RFID tag (to a radius of 25 mm or less) will result in an RFID tag's antenna being unable to respond to a signal put out by an RFID reader. As such, the crushing means of an embodiment of the present invention will result in the effective disablement of the RFID tag 110.

A user of an embodiment of the present invention would be alerted not only that the RFID tag 110 was not putting out a signal, but in addition, that tampering may have occurred by visually observing that the spring 130 was unloaded and that the plate 120 was in a position near the top of the housing 100.

An embodiment of the present invention also allows one to quickly identify and locate a particular asset or good secured by the RFID lock 10. Prior to transporting a good or asset contained in a transportable container, a user of an embodiment of the present invention would record each unique identifying code associated with each RFID tag 110 contained in a housing 100. At every location with an RFID reader system in place, the user would then be able to monitor the unique identifying codes associated with the goods or assets. The user may know not only what the particular good or asset was, but in addition, may know the location of the good or asset at the time the RFID tag 110 was read. In addition, as described previously, if an RFID tag 110 was disabled during the course of the transportation of the asset or good, the user would quickly be able to determine the good or asset and that someone potentially tampered with such good or asset. The use of RFID tags to identify and locate assets or goods is well known in the art.

Figures 2, 2A:
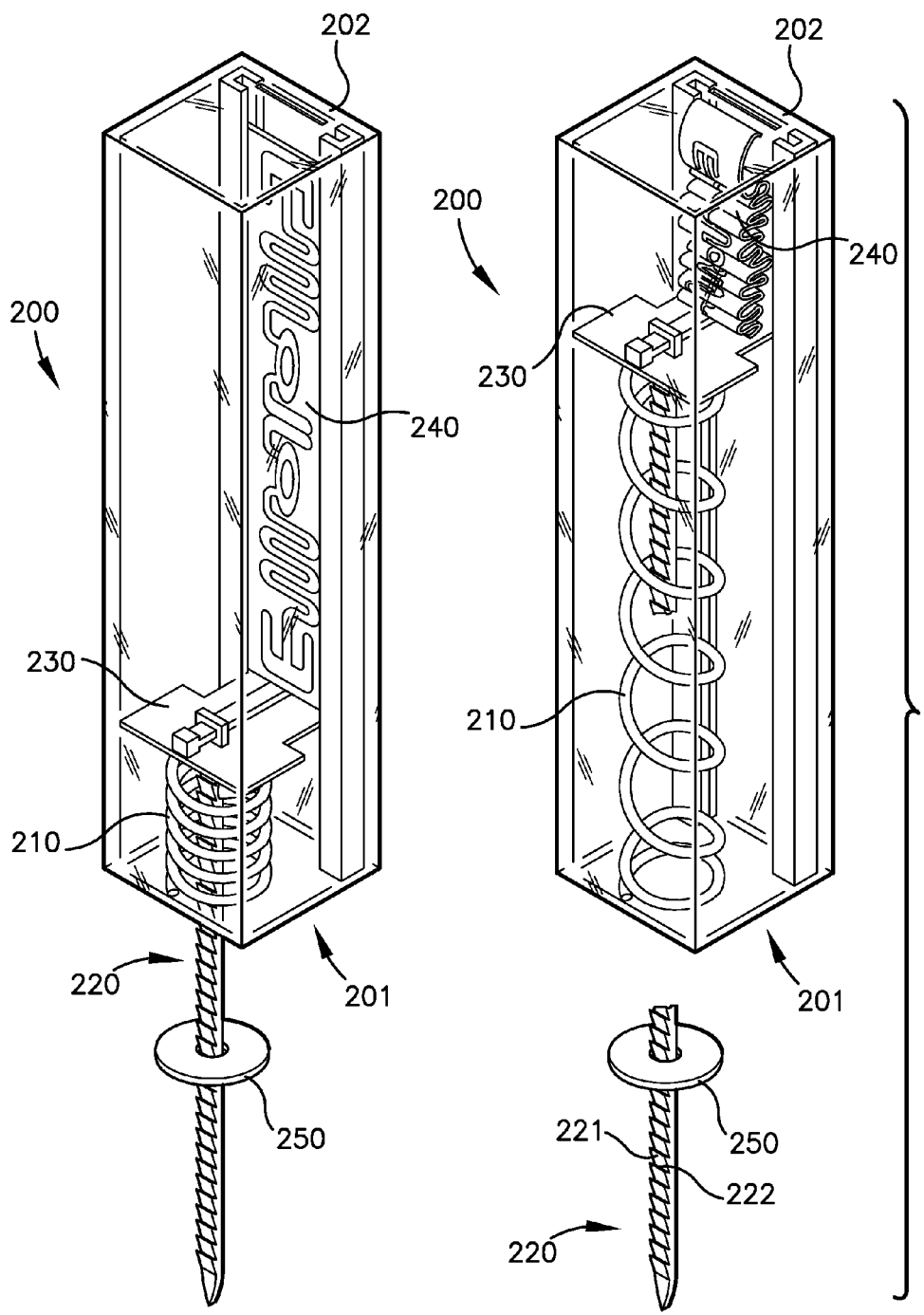
FIG. 2 is a perspective view of second embodiment of a RFID lock according to the invention with walls broken away to illustrate details thereof.
FIG. 2a is a view similar to FIG. 2 of the second embodiment and shows a disabled or crushed RFID element according to the invention.

Referring now to FIG. 2, another embodiment of the present invention is shown comprising a housing 200 having a bottom opening 201, an RFID slot 202 configured to receive and hold a flexible RFID tag 240 in place in the housing 200, a spring 210, a portion of a locking stem 220, a flange 230, an RFID tag 240; and a locking washer 250. The housing may be made of any suitable material, such a plastic, ceramic or metal, that is resistant to moisture and electrical charge. In addition, the housing must be made of any suitable material that allows a signal from the RFID tag's antenna to be detected. FIG. 2 shows the spring 210 in a compressed state and the flange 230 in a horizontal position (relative to the vertically positioned RFID tag 240) located underneath the RFID tag 240. Positioning the flange 230 underneath the RFID tag 240 is accomplished by first pulling the locking stem 220 in a direction that is downward or away from the bottom opening 201 of the housing 200. The locking stem 220 is connected to the flange 230. Pulling the locking stem 220 downward forces the flange 230 to move downward towards the bottom opening of the housing 200 and in addition loads or compresses the spring 210. Prior to pulling the locking stem 200 down, the hinge flange 230 rests against the RFID tag 240 in a vertical position adjacent the top end of the housing 200. As the flange 230 is pulled downwards, the pulling force from the locking stem 220 incrementally turns the flange 230 from its vertical position to the horizontal position seen in FIG. 2. Once the flange 230 turns to its horizontal position, it locks into such horizontal position by way of a locking flange mechanism. While a simple and cost-effective embodiment is shown in FIG. 2, it is contemplated that several mechanisms exist and may be utilized to hold an RFID tag in a housing and load a spring. The embodiment in FIG. 2 is shown by way of example and is not meant to limit the means of holding an RFID tag and loading a spring. After the flange 230 is positioned underneath the RFID tag 240, the locking washer 250 is used to secure the locking stem 220. The locking stem 220 is secured by the locking washer 250 through a one-way ratchet design of the locking stem 220. A plurality of ratchets 221, 222 are located on the locking stem 220. The ratchets 221, 222 prevent the locking stem 220 from moving back through the locking washer 250 because of the one way ratchet design. A user will continue to pull the locking stem 220 through the locking washer 250 until the locking washer 250 rests against the bottom of the housing 200. In this way, the spring 210 remains in a loaded or compressed state unless and until the locking stem 220 is cut or the locking washer 250 removed from the locking stem 220.

Referring now to FIG. 2a, the embodiment of the present invention shown in FIG. 2 is now shown in a disabled or tampered state. The locking washer 250 has been removed from the locking stem 220. With nothing to prevent the spring 210 from returning to its uncompressed state, the locking stem 220 and flange 230 are pushed upwards from the force of the spring 210 uncoiling. Since the flange 230 is locked in its horizontal position underneath the RFID tag 240, the upward pushing force of the spring necessarily crushes or crumples the RFID tag 240. It is well known in the art that an RFID tag that is crushed or crumpled becomes unreadable or virtually unreadable because of the disruption in the signal emitted from the antenna of an RFID tag. The embodiment of the invention shown in FIG. 2 and FIG. 2a is provided by way of example only and is not meant to limit the means for crushing or disabling an RFID tag. For example, it is contemplated that an RFID tag may be disabled by way of a cutting means. In such a device, tampering with the RFID lock would result in a sharp object cutting the RFID tag in a location such that it would be effectively unreadable by an RFID reader. Yet another example contemplated as a means for disabling the RFID tag is a pneumatic force that is activated by the tampering of the RFID tag. In lieu of a spring, the activation of a pneumatic force would push a flange or tab located underneath the RFID tag so that it crushes or crumples the RFID tag. In such a device, a housing may be vacuum sealed with a sealed hose extending from the bottom end of the housing. A cutting of the hose would introduce air pressure into the housing thereby forcing a tab upwards and crushing an RFID tag.

Figure 3:
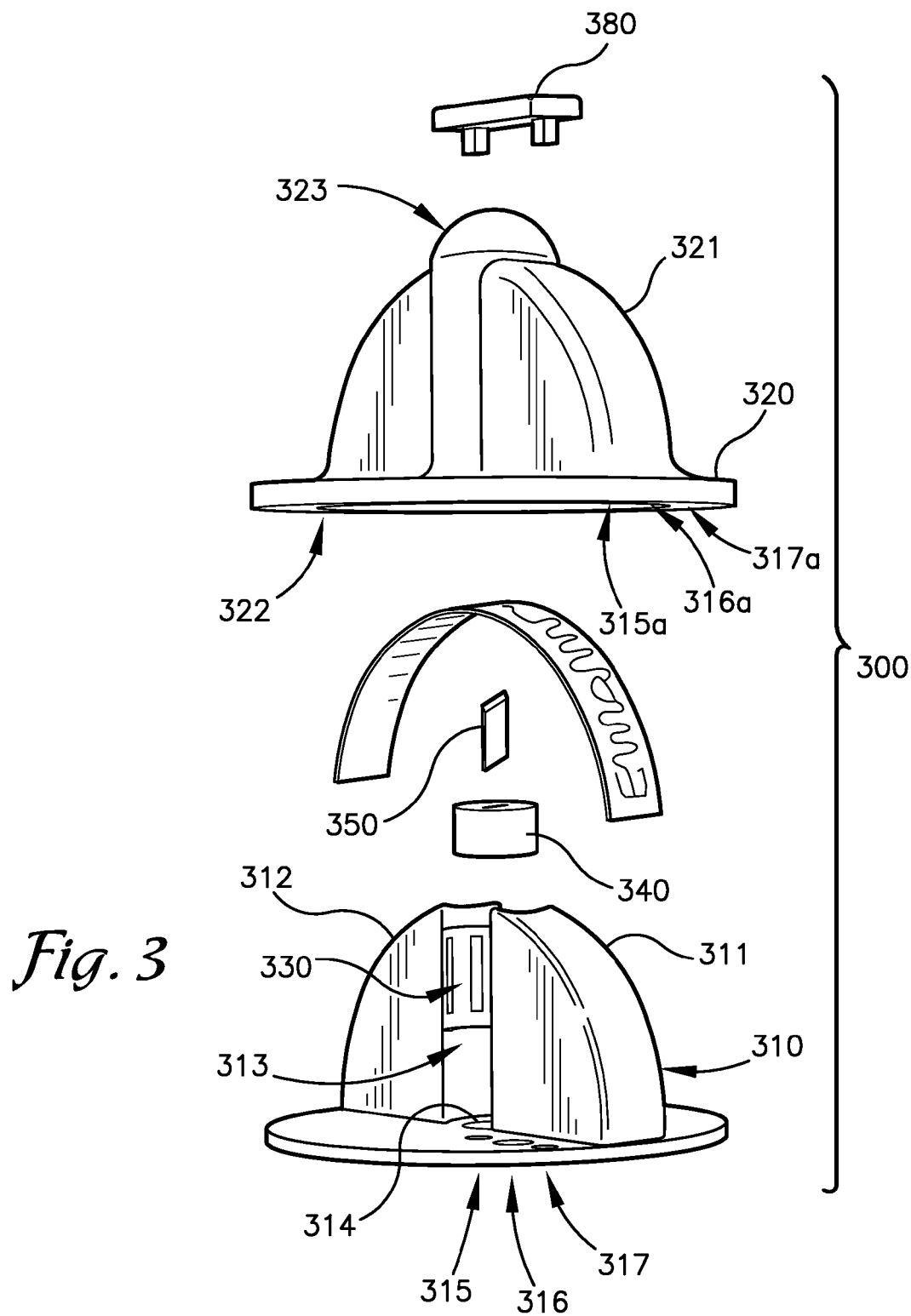
FIG. 3 is an exploded side perspective view of a third embodiment of an RFID lock according to the invention.
Figure 3A:
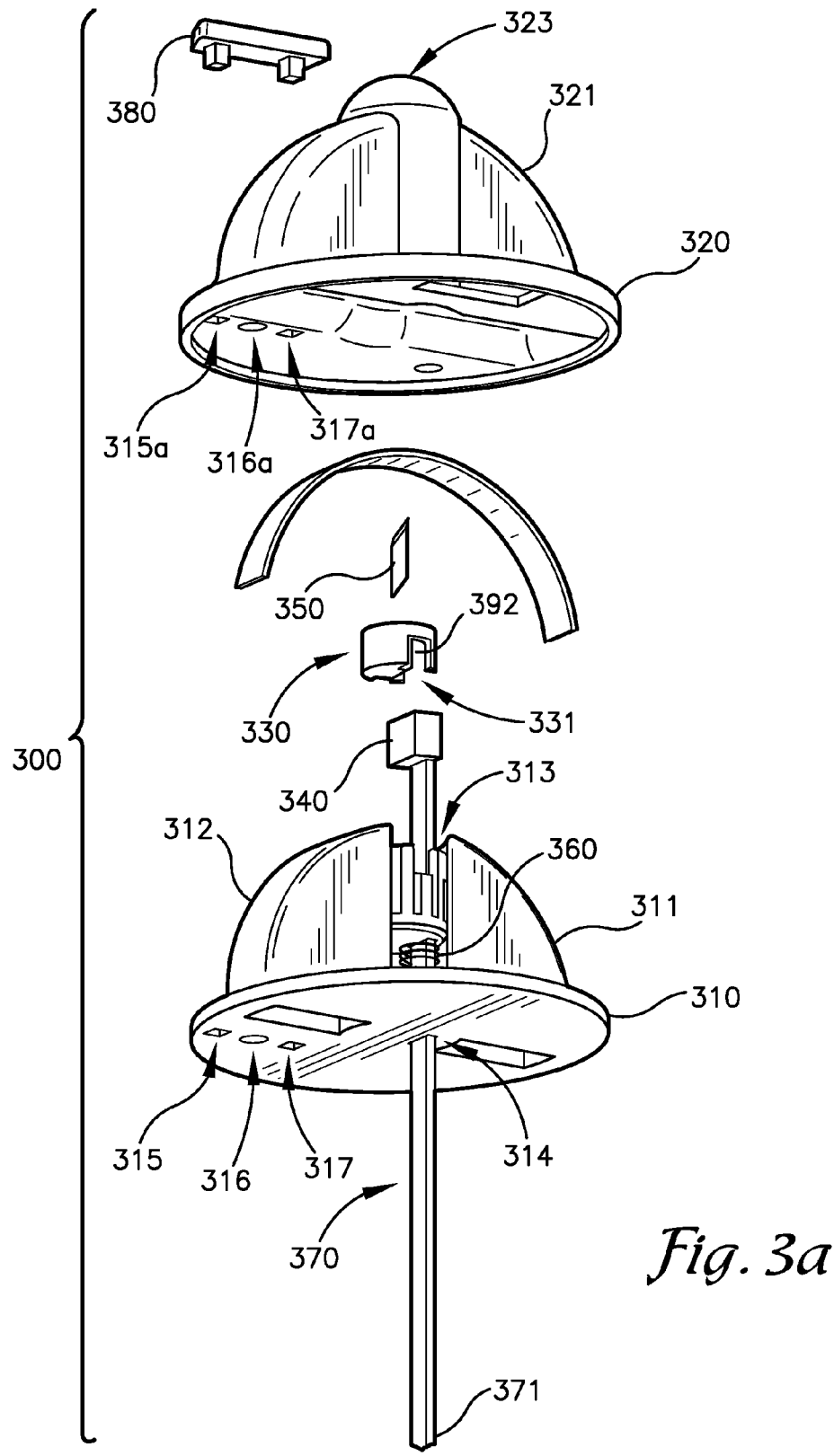
FIG. 3a is an exploded bottom perspective view of the third embodiment of an RFID lock according to the invention.

Referring now to FIG. 3 and FIG. 3a, another embodiment of the present invention is shown comprising an RFID lock 300 having a foundation 310, a cover 320; a fastener end container 330; a blade holder 340, a blade 350, a spring 360, a fastener 370, and a one-way ratchet fastener lock 380. The foundation 310 may be made of any suitable material that is weatherproof and resistant to easy breakage including but not limited to metal, plastic or ceramic. Without limiting the scope of the present embodiment of the invention, the foundation 310 may be formed from a hard plastic substance such as polyethylene, have a disc shaped bottom base that is generally flat on its bottom surface. Alternatively, the bottom base of the foundation may be square, rectangular, oval, or any other shape that a user of the embodiment of the invention deems appropriate for a particular application. The foundation 310 may also have two raised circular sectors 311, 312 extending from the top surface of its disc shaped bottom base. Alternatively, the foundation 310 may have two matching rectangular or square cuboids. The circular sectors 311, 312 are separated by a gap 313. The gap 313 when covered by the raised semicircular wedge 321 of the cover 320, forms a passageway that restricts the lateral movement of the fastener end container 330, the blade holder 340 and the blade 350 such that the fastener end container 330, blade holder 340 and blade 350 may move vertically but not horizontally. The foundation 310 also has a fastener hole 314 extending through its disc shaped bottom base and located between its two raised circular sectors 311, 312 in the area of the gap 313. The foundation 310 may also have locking holes 315, 316, 317 that extend through its disc shaped bottom base.

The shape of the cover 320 of the RFID lock 300 is made so that it generally matches the shape of the raised surface of the foundation 310. Additionally, the shape of the cover 320 is made so that it tightly encloses the foundation's 310 two raised circular sectors 311, 312 and the top surface of the foundation's disc shaped bottom base. Alternatively, if the foundation 310 has two matching raised rectangular or square cuboids, the cover 320 would also be made so that it tightly encloses such raised structures on the foundation's 310 top surface. However, in the present embodiment of the invention, the cover 320 has a disc shaped bottom base and a raised hollow semicircular wedge 321 extending from the top surface of the disc shaped bottom base. As shown in FIG. 3a, when viewed from the bottom of the cover 320, the hollow semicircular wedge forms a cavity that accepts the two raised circular sectors 311, 312 of the foundation 310. The cover 320 may also have a portal through its disc shaped bottom surface that allows an identifying number, such as a bar code number, placed on the foundation 310 to be read. The cover 320 like the foundation 310 may be made of any suitable material that is weatherproof and resistant to easy breakage including but not limited to metal, plastic or ceramic. In addition, the material used to fashion the cover and the foundation must be of any suitable material, which allows a signal to be detected from a radio frequency identification tag's antenna. The semicircular wedge 321 of the cover 320 has a dome 323 formed at its top which allows the dome 323 to accept the fastener end container 330, the blade 350 and the blade holder 340 in the event of a "triggering event." The cover 320 may have also have locking holes 315a, 316a, 317a that extend through the surface of its disc shaped bottom base and that match and correspond to the locking holes 315, 316, 317 of the foundation 310.

The spring 360 may be any suitable helical compression spring. When compressed, the spring 360 will exert a force on the bottom surface of the fastener end container 330.

In the present embodiment of the invention as shown in FIG. 3, a zip tie fastener 370 made of any suitable material such as plastic or metal may first have its non-fastening end 371 guided through an opening 331 located in the bottom of the fastener end container 330. The fastener end container 330 may be fashioned in the form of a cup shape having an open top, raised sides and a bottom. The opening 331 in the bottom of the fastener end container 330 is of sufficient dimensions to allow the non-fastening end 371 of the fastener to pass through, as well as the entire length and diameter of the fastener 370, except for the fastening end 372. Such a design allows a user to freely pull on the fastener 370 until the fastening end 372 of a fastener 370 engages the opening 331. Once this occurs, since the fastening end 372 may not be pulled through the opening 331 of the fastening end container 330, further pulling of the fastener 370 will force the fastener end container's 330 bottom to load or compress an end of a spring 360 placed in the gap 313.

Next, the spring 360 is placed in the area formed by the gap 313 of the foundation 310. The user guides the non-fastening end 372 of the fastener 370 through the central diameter of the spring 360, and then through the fastener hole 314 located through the surface of the foundation 310. The blade holder 340 and blade 350 may also fit in or be attached to the fastener end holder 330. The blade holder 340 may be of any suitable shape that fits within or attaches to the open cup space of the fastener end holder 330. For example, the blade holder 340 may take the shape of a semi-cylindrical wedge with a groove formed to accept the blade 350. The blade 350 is attached to the blade holder 340 by any suitable means including, but not limited to, gluing or welding. Moreover, the blade holder 340 may be attached to the fastener end container 330 through any suitable means including, but not limited to, gluing or welding.

To set the current embodiment of the invention, a user would continue to pull the non-fastening end 372 of the fastener 370 until the tip of the blade 350 is below the area of the gap 313 spanning the highest points of the two raised circular sectors 311, 312. Preferably, a user pulls the non-fastening end 372 of the fastener 370 away from the bottom surface of the foundation 310 until the fastener end container 330 can no longer travel in a downward direction away from the dome 323 of the cover 320 and the blade 350 is at its further location away from the dome 323.

Figure 4:
FIG. 4 is a top view of an RFID tag.

Next, an RFID tag 400, shown in FIG. 4, that is adhesive on one side is placed with its adhesive side facing the surfaces of the curved arcs of the two raised circular sectors 311, 312. Proper placement of the RFID tag 400 will result in a majority of the RFID tag 400 adhering to the surface of the curved arcs of the two raised circular sectors 311, 312 and a portion of the RFID tag 400, which is not adhered to the surface of the curved arcs, tautly spanning the top of the gap 313 between the two raised circular sectors 311, 312. The cover 320 of the RFID lock 300 is then placed over the foundation 310 so that the locking holes 315a, 316a, 317a match the locking holes 315, 316, 317 on the foundation 310.

A one-way ratchet fastener lock 380 may then be placed in locking holes 315a and 317a. Securing means such as bolts, rivets or screws may be used to secure the one-way ratchet fastener lock 380, the cover 320 and the foundation 310 of the RFID lock 300 tightly together. Care must be taken so that a user does not allow the fastener end container 330 holding the blade 350 to move back in a direction towards the dome 323 after the RFID tag 400 is adhered to the surfaces of the curved arcs of the two raised circular sectors 311, 312. Releasing the fastener 370 will result in a triggering event that disables the RFID tag 400. Releasing the non-fastening end of the fastener 370 will cause the spring 360 to unload and thereby thrust the fastening end container 330, blade 350 and blade holder 340 in a direction towards the dome 323 of the cover 320. The blade 350 that is employed is sufficiently sharp and configured so that it will substantially cut the antenna portion of the RFID tag 400 that tautly spans the gap 313. Cutting an RFID tag will result in its disablement so that an RFID tag reader will be unable to discern a signal from the antenna of the RFID tag.

Next, taking care that the blade 350 does not cut the RFID tag 400, the user will guide the non-fastening end 372 of the fastener 370 first through, for example, the metal rings of a door or hatch that the user desires to secure. The fastener 370 is then guided through the locking holes 316, 316a from the bottom surface of the foundation 310, through to the top surface of the cover 320. In an alternative embodiment of the present invention, a one-way ratchet locking washer such as the one shown and described in FIG. 2 may be employed directly beneath the bottom surface of the foundation 310 in order to attach the RFID lock 300 to the opening that the user desires to secure and to prevent the fastener 370 from moving back in the direction of the RFID lock 300. As explained previously, the fastener 370 has ratchets that ensure it will not move in reverse direction once it is pulled through the one-way ratchet fastener lock 380. The user pulls the fastener 370 until there is no slack left in the fastener 370 between the RFID lock 300, the opening to be secured and the fastener lock 380.

The embodiment of the present invention is now in a set position and if a person attempts to tamper with the RFID lock 300 by cutting the area of the fastener 370 between the one-way ratchet fastener lock 380 and the bottom of the foundation 310, the spring 360 will unload and thrust the blade 350 through the portion of the RFID tag 400 spanning the gap 313 between the two raised circular sectors 311, 312. This in turn will disable the RFID tag 400 and once a truck, for example, passes through an RFID reader gate, the user of the embodiment of the invention will quickly and easily know that the RFID lock has been tampered with and/or disabled because a signal will not be detected from the tampered RFID tag's antenna.

The present invention contemplates that there are many ways in which an RFID tag may be cut, crushed or ultimately disabled within a housing. The foregoing embodiments are provided by way of example only and in no way are meant to limit the present invention.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

I claim:

1. An RFID locking apparatus comprising:
   a housing forming a cavity configured to hold an RFID tag having an antenna, the housing being comprised of a material that allows a signal from the antenna to be detected;
   a connector configured to secure the housing to an opening that provides access to one or more assets,
   a plate disposed in the cavity;
   a spring having a lower end disposed at a bottom of the housing and an upper end disposed at the plate;
   a locking stem attached to the plate and extending outwardly from the bottom of the housing to engage with the connector, the locking stem including a plurality of one-way ratchets to bias the spring into a compressed position such that tampering with or removal of the connector releases the spring from the compressed position to cause the plate to impact and destructively damage the antenna; and
   a lock washer configured to connect with at least one of the ratchets to prevent the locking stem from moving in a reverse direction.

2. The RFID locking apparatus of claim 1, wherein the housing includes a top opening configured to receive the RFID tag for insertion into the cavity and further configured to prevent the RFID tag from exiting the cavity.

3. The RFID locking apparatus of claim 1, wherein the housing comprises a material that is resistant to moisture and electrical charge.

4. The RFID locking apparatus of claim 1, wherein the plate is adapted to destructively damaged the antenna is such that an RFID reader cannot detect a signal from the RFID tag.

5. The RFID locking apparatus of claim 1, wherein the plate is adapted to destructively damage the antenna by crushing the antenna.

6. The RFID locking apparatus of claim 1, wherein the RFID tag is flexible.

7. The RFID locking apparatus of claim 1, wherein the one or more assets are in a trailer.

8. The RFID locking apparatus of claim 1, wherein the opening is a hatch.

9. The RFID locking apparatus of claim 1, wherein the one or more assets are in a transportable container.

* * * * *